US00RE36676E

United States Patent [19]

Sourlis

[11] E Patent Number: Re. 36,676

[45] Reissued Date of Patent: May 2, 2000

[54] MORTAR AND DEBRIS COLLECTION DEVICE AND SYSTEM

[76] Inventor: Tom Sourlis, 3646 Ridge Rd., Highland, Ind. 46322

[21] Appl. No.: 09/128,458

[22] Filed: Aug. 4, 1998

Related U.S. Patent Documents

Reissue of:

[64] Patent No.: 5,230,189
Issued: Jul. 27, 1993
Appl. No.: 07/862,324
Filed: Apr. 2, 1992

[51] Int. Cl.[7] ..... E02D 19/00

[52] U.S. Cl. ..... 52/169.5; 52/379; 52/562

[58] Field of Search ..... 52/421, 169.5, 52/302, 303, 310, 379, 380, 381, 382, 383, 513, 562, 565; 405/50

[56] References Cited

U.S. PATENT DOCUMENTS

| | | | |
|---|---|---|---|
| 1,746,816 | 2/1930 | Boes . | |
| 1,954,730 | 4/1934 | Erickson . | |
| 2,147,035 | 2/1939 | Henderson . | |
| 2,298,319 | 10/1942 | Vatet . | |
| 2,329,585 | 9/1943 | Brewer . | |
| 2,705,887 | 4/1955 | Xanten . | |
| 2,934,931 | 5/1960 | Johnson . | |
| 3,287,866 | 11/1966 | Beuilacqua . | |
| 3,293,810 | 12/1966 | Cox et al. . | |
| 3,562,892 | 2/1971 | Parezo . | |
| 3,668,829 | 6/1972 | Nelson . | |
| 3,852,925 | 12/1974 | Gazzo . | |
| 4,282,691 | 8/1981 | Ridson . | |
| 4,333,281 | 6/1982 | Scarfone . | |
| 4,381,630 | 5/1983 | Koester . | |
| 4,486,986 | 12/1984 | Cosenza . | |
| 4,612,742 | 9/1986 | Beuilacqua . | |
| 4,852,320 | 8/1989 | Ballantyne | 52/562 X |
| 4,907,385 | 3/1990 | Biodrowski | 52/169.5 |
| 4,910,931 | 3/1990 | Pardue, Jr. . | |
| 4,986,699 | 1/1991 | Bohnhoff . | |

FOREIGN PATENT DOCUMENTS

| | | |
|---|---|---|
| 36580 | 10/1935 | Netherlands . |
| 1566196 | 4/1980 | United Kingdom . |

*Primary Examiner*—Creighton Smith
*Attorney, Agent, or Firm*—Rockey, Milnamov & Kat

[57] ABSTRACT

A mortar and debris collection device for a cavity wall construction has a non-water absorbent body formed with circuitous paths therethrough making the body water-permeable. The collection device has a porosity sufficient to permit water to pass therethrough but insufficient to permit mortar and other debris to pass therethrough to weep holes or other water channels covered by the collection debris. The device may be freely placed on the wall base within the cavity to cover the opening of a weep hole, or may also be placed on existing wall ties within the cavity.

50 Claims, 5 Drawing Sheets

MORTAR AND DEBRIS COLLECTION DEVICE AND SYSTEM

Matter enclosed in heavy brackets [ ] appears in the original patent but forms no part of this reissue specification; matter printed in italics indicates the additions made by reissue.

FIELD OF THE INVENTION

This invention generally relates to mortar and debris collection devices, such as are used in association with cavity wall constructions. More particularly, in the course of construction of a masonry cavity wall, mortar and other debris falls into the cavity, and may then block weep holes or other water outlets necessary to prevent moisture build-up within the wall cavity. This invention more specifically relates to a device and system for collecting loose mortar and other debris in order to prevent the same from blocking the weep holes that ventilate such a cavity wall construction.

BACKGROUND OF THE INVENTION

The present invention found its origin in so-called masonry cavity wall constructions. Masonry cavity walls have inner and outer vertical walls. The inner wall is typically constructed from wood with an inner surface of drywall, structural clay tile, vertical stacks of mortared bricks, or a shear concrete surface. The stacks of bricks that are held together by mortar. A space, or cavity, exists between the two walls, which may be partially filled with insulation. It is applicant's understanding that the Brick Institute defines a "cavity wall" as having a space greater than about 2 inches but not more than 4 inches between the masonry wythes.

A crack in the wall can allow water to enter the cavity. More often, however, moisture can condense on the inside of the wall under changing temperatures. Either way, water may collect in the cavity between the inner and outer wall.

The presence of moisture in the space between the inner wall and outer wall is undesirable for a number of reasons. First, the trapped moisture can degrade the inner and outer wall, causing a weakening of the structure. Second, the presence of water under freezing temperatures may also cause cracks in the walls when the water expands as it freezes. Trapped water in the cavity between the inner and outer walls may cause the walls to become discolored, and may even leak into the dwelling.

To overcome the problems associated with water trapped within a masonry cavity wall, weep holes are commonly placed along the base of the outer wall. The weep holes allow water to pass from the cavity to drain outside the wall structure.

During construction of a masonry cavity wall, excess mortar and other debris can and does fall between the inner and outer wall. When the bricks are stacked during the erection of the outer wall, for example, mortar droppings are squeezed into the space between the walls. The excess mortar, as well as other debris, drops to the base of the cavity, and can block the weep holes.

Wicks have been used in weep holes. For instance a cotton wick, such as a segment of cotton rope, has been used in weep holes. Such wicks can be extended from the weep hole up within the cavity to a height considered sufficient to exceed any build-up of mortar droppings. Moisture within the cavity is absorbed by the wick, and passed to the outside face of the wall. Wicks are preferably made from cotton, because nylon or hemp are considered less efficient in transferring water. The cotton wick, however, may become broken or squashed, and will rot with time. Accordingly, the weep hole may still become blocked during and after construction, thereby preventing moisture in the cavity from passing to the outside of the wall.

Another attempt to overcome the problems associated with obstructed weep holes is described in U.S. Pat. No. 4,852,320. The '320 patent describes embodiments of a mortar collection device located in the wall cavity. One embodiment is adapted to collect mortar but deflect water. This mortar collection device has an upper surface with sufficient inclination to cause moisture to slide off, but is purportedly insufficiently inclined to prevent mortar from falling off. A second embodiment has a plurality of vertically aligned passageways of dimension sufficient to allow moisture to pass therethrough, but of insufficient dimension to allow mortar to pass therethrough. This honeycomb-like mortar collection device of the '320 patent is made from a non-water absorbent material, such as plastic.

It can be seen, nonetheless, that mortar or other debris may still roll down the surface of one or more of the collection devices of the '320 patent and plug a weep hole. Also, the '320 patent mortar collection devices are specially adapted to be carried on reinforcement rods extending between the inner and outer wall. They are not shown adapted to simply rest on the base of the wall, so as to completely cover the weep holes. Furthermore, in the second embodiment of the '320 patent described above having the vertical passageways, small pieces of mortar on other debris may still pass through the holes extending through the unit, thereby allowing the debris to reach the base of the wall and plug the weep holes.

It would be desirable to have a mortar and debris collection device capable of resting on the base of the wall in the space between the inner and outer walls to cover and protect the weep holes, as well as being supportable at different heights on the wall without the use of any additional fixation device or special attachment design feature. Furthermore, a collection device should prevent mortar droppings and other debris of any appreciable size from reaching the weep holes.

SUMMARY OF THE INVENTION

Accordingly, it is a principal objective of this invention to provide a mortar and debris collection device that can rest on the base of the wall cavity to cover and protect one or more weep holes preventing mortar or debris of any significant size from reaching a weep hole and thereby blocking the holes. In addition, a related objective is to provide such a collection device which can be placed at different heights within the cavity without the use of any fixation device or special adaptation of the collection device.

Another objective is to provide a surface configuration for such a collection device which facilitates adequate dispersal of debris thereon to assure a water path remains to the collection device.

To the foregoing and other ends, the improved mortar and debris collection device of this invention comprises, in one aspect of the invention, a water-permeable body formed with circuitous (non-linear) pathways therethrough, which body can be readily placed within a cavity wall construction. The inventive collection device can preferably be a non-absorbent water-permeable fibrous block having a porosity sufficient to permit water to pass therethrough, but insufficient to permit mortar or other debris of appreciable size to pass therethrough. Another embodiment contemplates laterally extending projections formed on a supporting board which form the circuitous path.

The collection device is intended to be placed on the wall base within the cavity to cover up and block one or more weep hole openings from mortar and debris. Water can migrate through the porous mass to a drain outlet, such as the weep holes, but mortar and debris cannot. It is furthermore contemplated that the collection device may also be placed on existing supports, such as ties, along the walls. No special fixation means for emplacement of the collection device is therefore required, and the collection device need not be specifically adapted for the particular application.

A preferred form of the collection device has upwardly extending protrusions, such as protrusions defining overhangs as well as steps, which serve to break up mortar and debris falling on top of the collection device. This prevents ponding of the material on the surface of the collection device.

In one embodiment of the invention, a plurality of screens having a porosity sufficient to permit water to pass therethrough but insufficient to permit mortar or other larger-size debris to pass therethrough, are organized in an overlapping arrangement in a collection device. The screens are overlapped such that a vertical line perpendicular to the base of the wall must intersect at least one screen in the device. Mortar and the like falling under the influence of gravity within the cavity must thereby contact at least one of the screens, and preferably two, preventing the mortar and debris from reaching the wall base and blocking a weep hole.

The objectives and advantages of the invention will be further understood with reference to the following detailed description of embodiments of the invention read in light of the accompanying drawings, in which:

DETAILED DESCRIPTION OF EMBODIMENTS OF THE INVENTION

Figure 1:
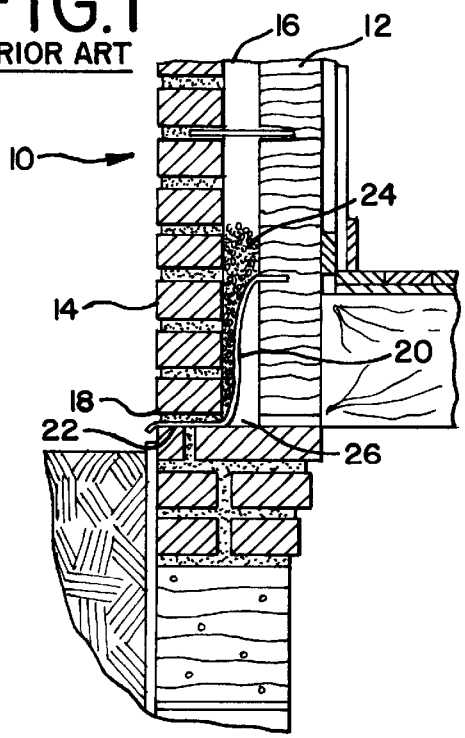
FIG.1 PRIOR ART
FIG. 1 is a sectional view of a prior art mortar collection device located in a cavity between an inner and outer wall.
Figure 2:
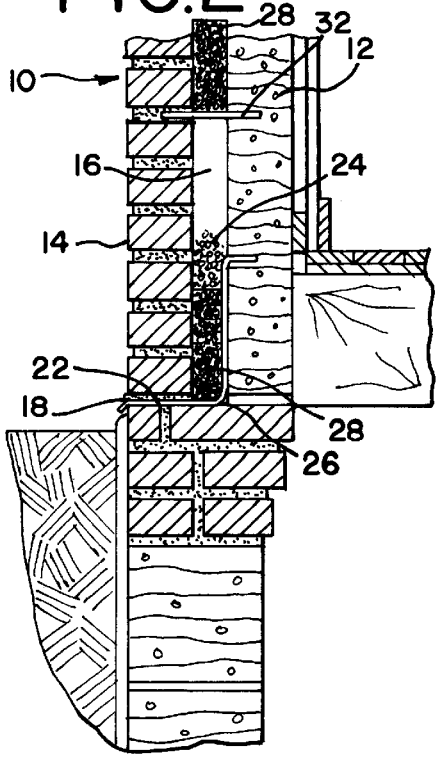
FIG. 2 is a sectional view similar to that of FIG. 1, but of a first embodiment of a collection device made according to the present invention.
Figure 3:
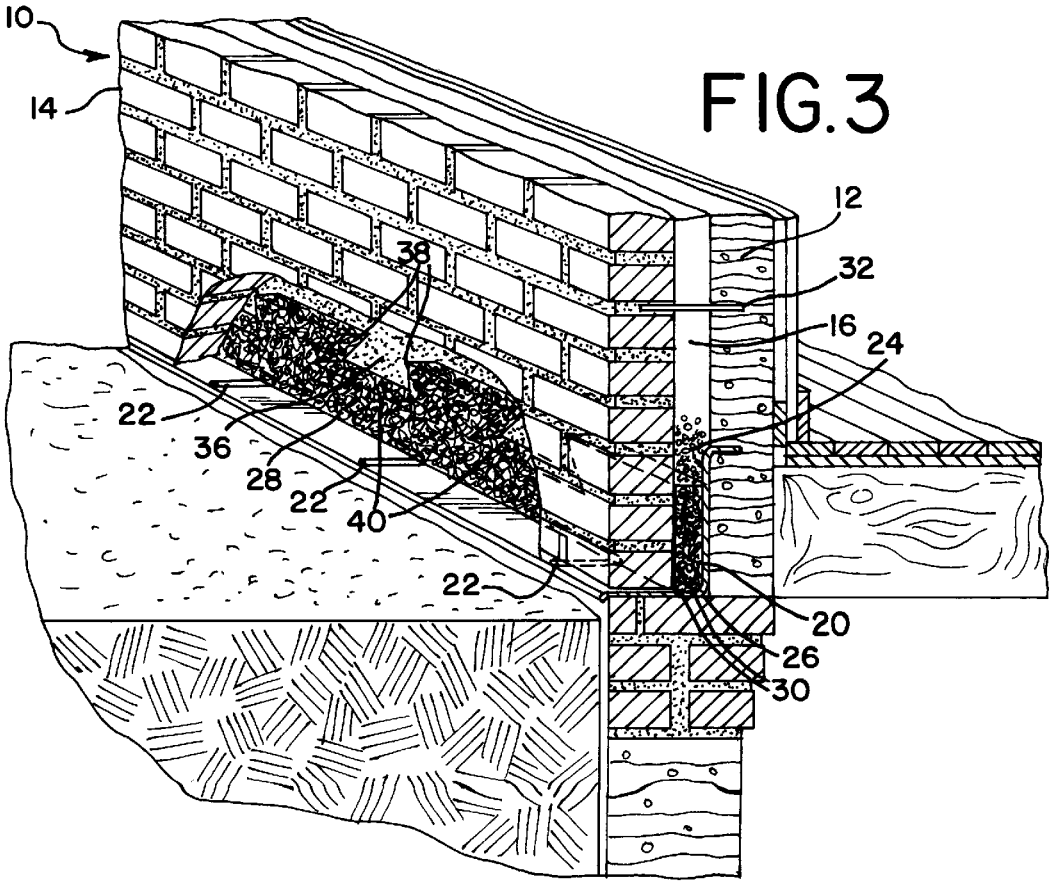
FIG. 3 is a perspective view partly in section and partially broken away of the embodiment of FIG. 2 located in a wall cavity.

Brick masonry cavity walls 10, as shown in FIGS. 1, 2 and 3, consist of two wythes of masonry separated by an air space. The interior masonry wythe (the inner wall) 12 may be brick, hollow brick, structural clay tile, wood or hollow or solid concrete masonry units, for example. The exterior masonry wythe 14 (the outer wall) is brick. The cavity 16 between the two wythes may be either insulated or left open as air space. The cavity has a typical width of about 2 to about 4 ½ inches, but could be smaller, although non-standard.

A common problem associated with a cavity wall construction is how to allow moisture, as from seepage or condensation, to pass from the cavity to outside the wall. Weep holes 18 creating an unobstructed opening passing from the cavity to the outside of the wall are provided to this end. Generally, the weep holes 18 will be placed approximately two feet apart at the base of the outer wall 14. Moisture collecting in the cavity is intended to run down the cavity wall and be directed by flashing 20 toward the weep holes 18. The flashing 20 is composed of materials such as sheet metals, bituminous membranes, plastics or vinyls.

A cotton wick 22 may be placed within the weep hole extending into the cavity. The moisture from inside the cavity will be absorbed and passed to the other end of the wick. The end of the wick is left outside the wall to let the moisture evaporate outside the wall.

In the course of construction of a cavity wall 10 as shown in FIGS. 1–3, mortar 24 and other debris will commonly fall into the cavity 16 between the inner wall 12 and outer wall 14. FIG. 1 illustrates a prior art system for passing water to the outside face of the masonry wall 10. A cotton wick 22 is inserted within a weep hole 18 and extends through the veneer face and into the cavity 16. Moisture within the cavity is absorbed by the wick 22 and passed to the outside face of the wall. The wick 22 is preferably made from cotton, with nylon or hemp being considered less efficient than cotton in transferring moisture to the outside surface of the wall.

In the prior art structure depicted in FIG. 1, mortar and debris may fall all the way to the base of the wall 26, where the weep holes 18 are located. Because there is no easy access to the interior of the cavity 16, mortar and debris falling within the cavity 16 is not readily removable. If enough mortar 24 builds up around the weep holes 18, or if it simply lodges in the weep holes 18, the weep holes 18 will become plugged, causing water to pond between the walls 12, 14. The water can then leak into the structure, or cause cracking, deterioration and/or discoloration of the walls. Wicks have been found insufficient by themselves to assure that water can always pass through the weep holes.

FIG. 2 shows one embodiment of an improved mortar and debris collection device of the present invention. A fibroid body 28 according to the present invention rests on the base 26 of the cavity between the inner wall 12 and the outer wall 14, covering at least one weep hole 18. In this embodiment, the body has a generally rectangular shape with a flat bottom edge that will rest flush against the wall 14. The width of the body is roughly determined by the width of the cavity 16.

The body is preferably composed of non-absorbent plastic, such as, for example, the filament-type plastic used to surface walk-off mats. These materials are preferred because they are water-impervious, relatively inexpensive and can be formed into cutable blocks or sheets. A quantity of one or more of these materials is formed in a mass of random fibers with a density which is sufficient to catch and support mortar and other debris thereon without significant collapse, but allow water to pass freely therethrough.

A cotton wick 22 may be attached to, or formed with, the body 28 to aid in the passage of water from the wall. The wick 22 can serve to hold the body 28 in place. When used with such an integral wick 22, the body 28 would be emplaced when the wick holes were formed. Otherwise, it is contemplated that the mortar collection device of this invention will simply be set at the base 26 of the wall foundation covering respective weep holes 18, without the need of any fixation device. Flashing 20 can furthermore be directly attached to the bottom and/or back of the body 28.

The porosity of the body 28 made from the fibrous material can be quite varied, so long as it effectively serves to strain out the mortar and debris before it reaches the weep hoes. Most mortar and debris will be quite large, i.e., greater than ⅛ or 1/16 of an inch or clearly visible to the naked eye, so a porosity sufficient to catch such relatively large particulate matter will suffice to prevent plugging of the weep holes.

Besides being emplacable on the base of the cavity 16, fibrous bodies 28 may be placed on wall tie rods 32 above the base 26 of the cavity. The tie rods 32 are often part of the cavity wall structure, tying the inner wall 12 and the outer wall 14 together. As particularly shown in FIGS. 3 and 4, the body 28 would advantageously include reinforcing rods 30 extending along the bottom of the body to support and better distribute weight on the body 28 when not simply resting on the base 26 of the cavity 16. The reinforcing rods 30 will better enable a collection device to span adjacent tie rods 32 and still work effectively.

Figure 4:
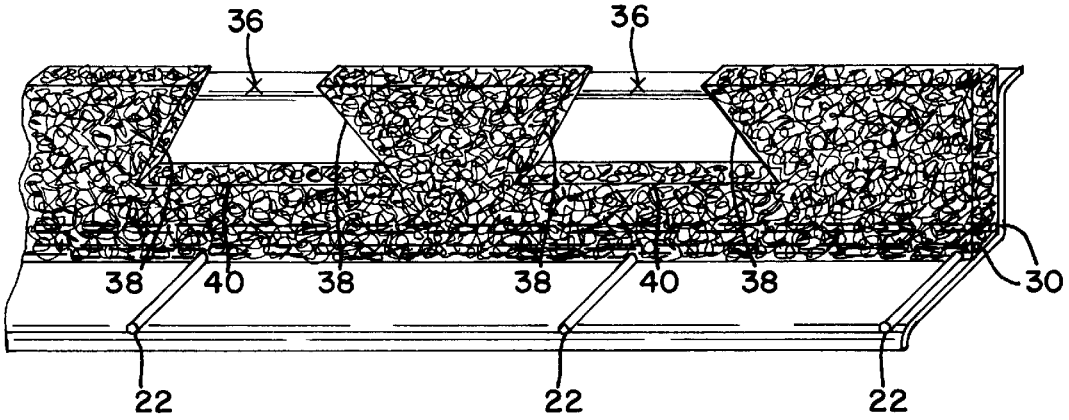
FIG. 4 is an enlarged perspective view of a portion of the embodiment of the collection device shown in FIG. 3.

A system using the collection device of FIGS. 2–4 would, for example, include bodies 28 placed on the base 26 in sufficient number to cover and block some or all of the weep holes 18 in the cavity 16. It could further include bodies 28, having the reinforcing rods 30, placed on tie rods 32.

The body 28 of the embodiment of FIGS. 2–4 has trapezoidal-like cutouts 36. Two slanted edges 38 of the body and a bottom edge 40 of the body (the latter running roughly parallel to the longitudinal axis of the body) define the cutout 36. The dove-tailed cutouts 36 thereby formed in the body 28 yield protrusions which help break up the mortar and other debris falling thereon to prevent ponding of moisture in the mortar and debris that collect on the collection device surface. The overhangs formed by the slanted sides 38 are intended to assure that gaps remain in fallen mortar and debris for water to progress to the body 28.

Figure 5:
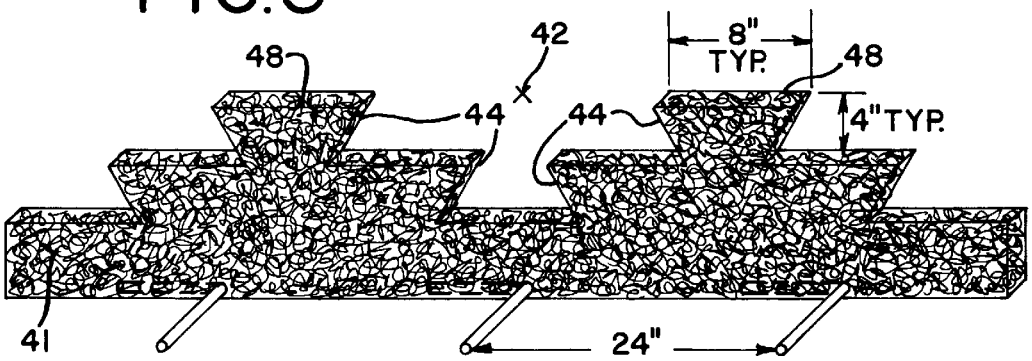
FIG. 5 is a perspective view of another embodiment of the inventive collection device.

FIG. 5 illustrates another embodiment of this invention having a fibrous mass 41 with a stepped configuration along its length created by a series of slanted edges 44. The top step 48 may have a length of approximately 6 to 8 inches, for example. The height of each step may be approximately 4 inches. Again, the stepped cutout 42 is intended to break up mortar and debris falling thereon to thereby prevent the ponding of moisture.

Figure 6:
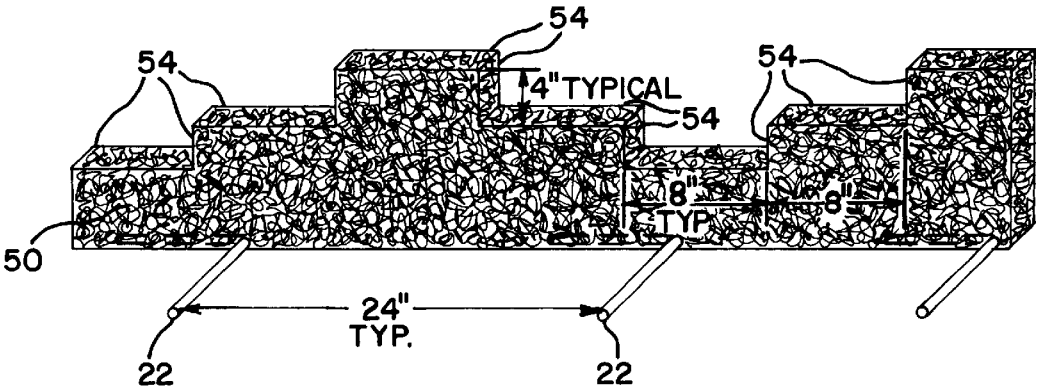
FIG. 6 is a perspective view of yet another embodiment of the inventive collection device.

FIG. 6 illustrates another embodiment of this invention with the fibrous mass 50 having rectangular cutouts formed by a series of perpendicular edges 54. In a presently contemplated embodiment, the steps would have a height of approximately 4 inches and a length of approximately 8 inches.

Figure 7:
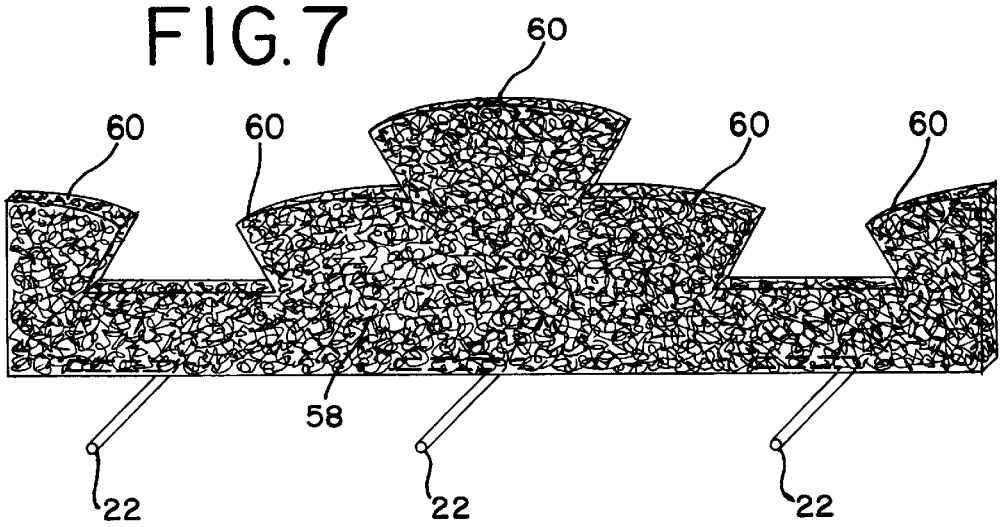
FIG. 7 is a perspective view of still another embodiment of the inventive collection device.

FIG. 7 illustrates yet a further embodiment of this invention. The debris collecting fibrous body 58 has dove-tailed cutouts formed from non-planar curved steps 60. This is another shape for the upper surface of the collection device designed to break up the mortar and other debris falling thereon, to thereby prevent the ponding of moisture on the surface of the body 58.

Figure 8:
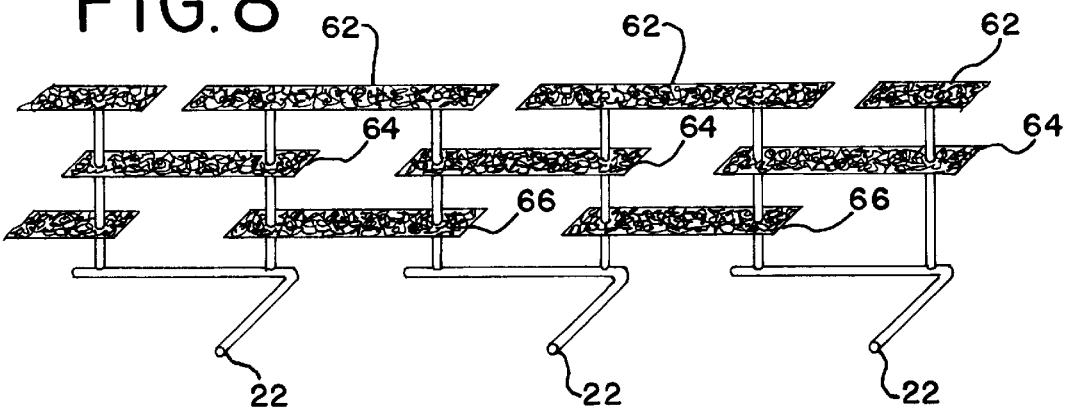
FIG. 8 is a perspective view of a further embodiment of the invention.

FIG. 8 illustrates another embodiment of this invention. Three series of planar screens 62, 64 and 66 having a porosity sufficient to permit water to pass therethrough but at least collectively insufficient to permit mortar and other debris to pass therethrough are arranged to form the collection device. A first plurality of screens 62 extend on one horizontal plane. On a second and lower horizontal plane, a plurality of screens 64 are arranged in spaced apart relation. On a third and still lower horizontal plane, a plurality of screens 66 are arranged in spaced apart relation, but with portions overlapping with screens 64 of the second horizontal plane. A vertical line extending substantially perpendicular through the collection device of FIG. 8 must therefore pass through at least one and move often two screens in this embodiment.

Generally, the screens should have a width determined by the width of the cavity 16. The screens can be formed of a sufficiently rigid screen material to maintain their shape when attached to vertical rods 68 or like supporting structure, or may each be provided with a rigid frame. Screen 62 may have a large mesh size to catch only the larger particles, with screens 64 and 66 having a smaller mesh. Wicks 22 may be attached to the base of the rods 68. Screen 62 might also be omitted entirely, if desired. Whether present or not, however, mortar droppings and other debris falling into the cavity 16 above the screen collection device of FIG. 8 must contact at least one screen to thereby become trapped and isolated from the weep holes.

Figure 9:
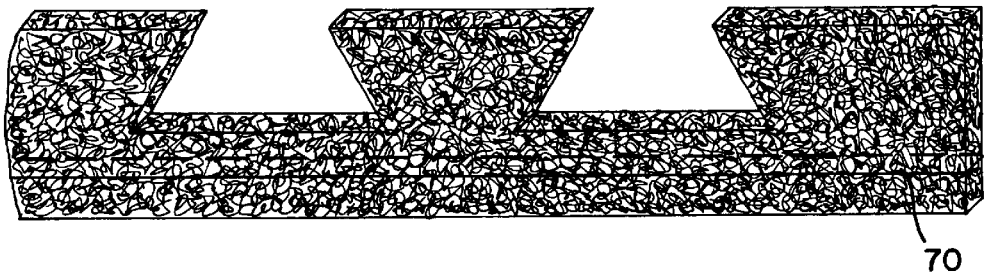
FIG. 9 is a perspective view of an embodiment similar to FIG. 4 having a fine porous layer therein.

FIG. 9 illustrates a modified embodiment similar to that of FIG. 4, except that a thin layer of material 70 is provided above the bottom of the fibrous body, which material has the ability to pass water but substantially no visible solids. Such a material could be the type of landscaping material used to control weeds. The layer could be located 1 to 2 inches above the bottom, for example.

Figure 10:
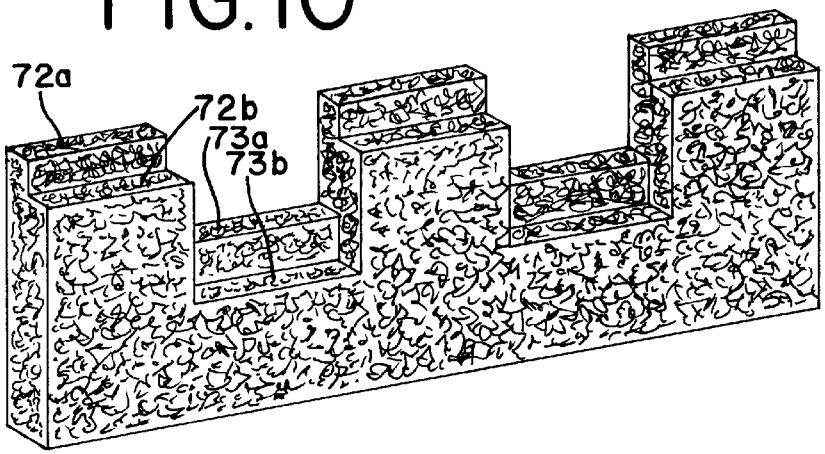
FIG. 10 is a perspective view of an embodiment having a stepped configuration across its horizontal thickness.

FIG. 10 illustrates an embodiment having a stepped upper surface extending across its horizontal thickness, i.e., perpendicular to its long axis. Steps 72a, 72b and 73a, 73b of the fibrous mass serve to prevent "bridging" of material across the space of the wall cavity (i.e., extending between the inner wall 12 and outer wall 14).

Figure 11:
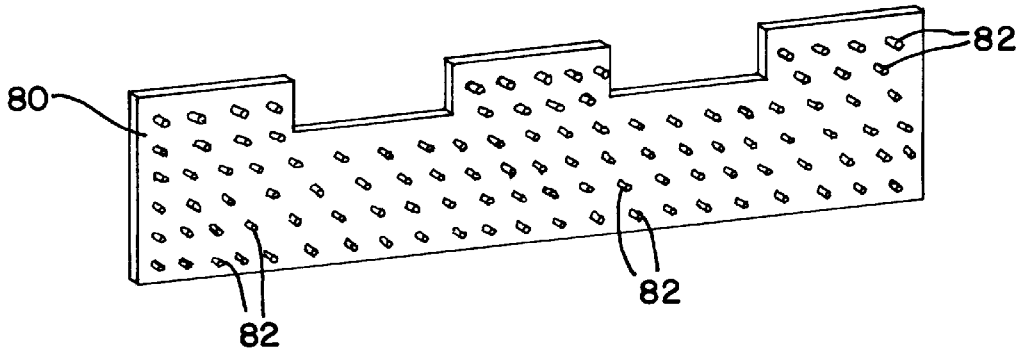
FIG. 11 is yet another embodiment employing a cleated lateral surface.

FIG. 11 is another variation on the basic inventive concept which utilizes a supporting base, such as a backing board 80, having a plurality of cleat-like projections 82 extending from one or both (see FIG. 12) of its lateral surfaces. The cleats 82 would preferably be staggered so as to provide a tortuous path for water and debris, and also preferably made of a flexible material so a to permit the FIG. 11 embodiment to fit within most common cavity wall spaces The FIG. 11 embodiment is intended to be placed in the cavity 16 (e.g., FIG. 3) with the backing board 80 against one wall and the cleats 82 extending across the gap and engaging the opposite wall.

Figure 12:
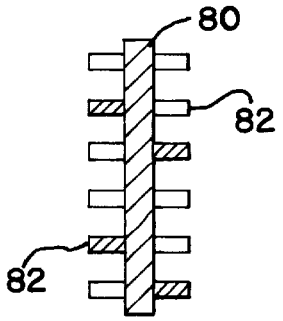
FIG. 12 is a cross-sectional view of an embodiment similar to that of FIG. 11 having cleats on both sides.
Figure 13:
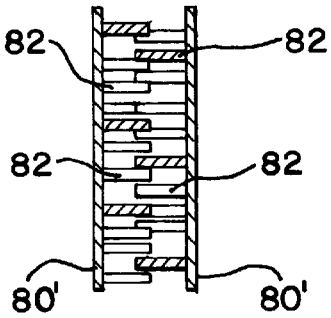
FIG. 13 is a cross-sectional view of an embodiment employing opposed cleated lateral surfaces.
Figure 14:
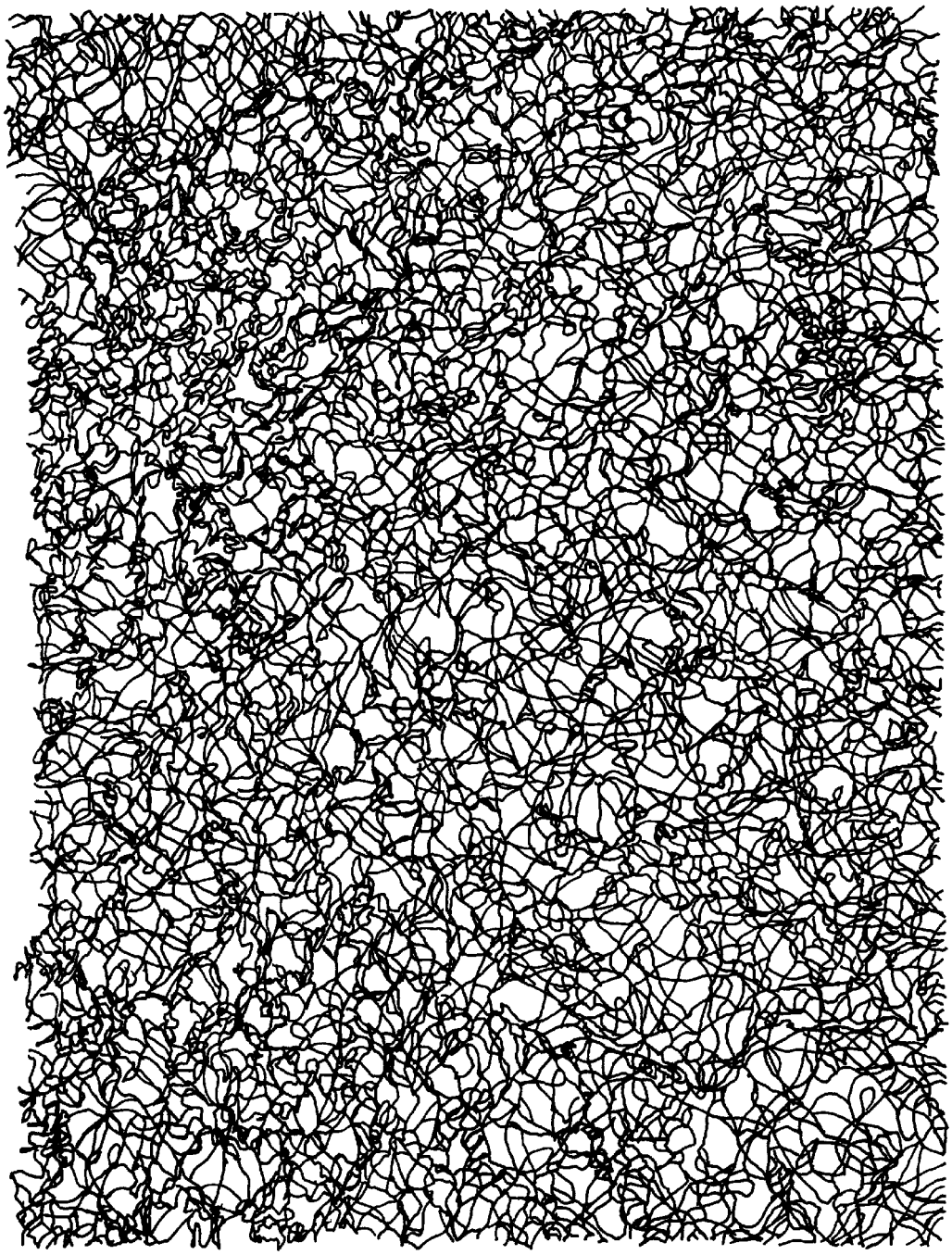
FIG. 14 is a front elevational view of a portion of the fibrous mass.

FIGS. 12 and 13 are modified embodiments similar in concept to FIG. 11. The FIG. 12 embodiment, shown here only in cross-section, has projections 82 extending from both lateral sides of the backing board 80. It would be placed in the middle of the cavity 16, with projections 82 engaging respective walls.

The FIG. 13 embodiment, again shown here only in cross-section, uses relatively thin backing boards 80' which are arranged in opposed relationship so that the projections 82 extending from respective lateral sides intermesh. The FIG. 13 embodiment would be placed in cavity 16 with the backing boards 80' abutting the walls defining the cavity.

Thus, while the collection device and system of this invention have been described with respect to a number of different embodiments, those of skill in this art will recognize changes and modifications in material, structure and form and the like which will still fall within the scope of the claims of this invention.

What is claimed is:

1. A mortar and debris collection device for use in a cavity wall construction having an inner wall and an outer wall with channels formed therein through which channels water can drain from a channel opening communicating with a cavity defined between the walls, comprising:

a water-permeable body positioned in alignment with at least some of said channel openings, said body having circuitous non-linear pathways therethrough which interrupt the downward movement of free-falling material and extending from an upper surface upon which water and debris can fall, and yielding a porosity for said body sufficient to permit water to pass therethrough, but mortar and other debris is [substantial] *substantially* prevented from passing therethrough, at least a portion of said body having a thickness dimension substantially the same as the cavity between said inner and outer walls*, said body having a plurality of upwardly facing first surfaces formed thereon that are separated by first horizontal spaces, and a plurality of upwardly facing second surfaces formed thereon that are separated by second horizontal spaces, said second surfaces elevated from said first surfaces, at least some of said first surfaces being disposed in vertical alignment with some of said second horizontal spaces between said second surfaces, whereby mortar and other debris falling under the influence of gravity within said cavity contacts at least one of said first and second surfaces*.

2. [The collection device of claim 1] *A mortar and debris collection device for use in a cavity wall construction having an inner wall and an outer wall with channels formed therein through which channels water can drain from a channel opening communicating with a cavity defined between the walls, comprising:*

*a water-permeable body positioned in alignment with at least some of said channels openings, said body having circuitous non-linear pathways therethrough which interrupt the downward movement of free-falling material and extending from an upper surface upon which water and debris can fall, and yielding a porosity for said body sufficient to permit water to pass therethrough, but mortar and other debris is substantially prevented from passing therethrough, at least a portion of said body having a thickness dimension substantially the same as the cavity between said inner and outer wall,* wherein said body is elongated along a long axis and has an upper surface with a non-planar contour of peaks and valleys along said long axis adapted to break up accumulations of mortar and debris falling thereon.

3. The collection device of claim 2 wherein said body has an upper surface with a repeating dove-tailed contour along its long axis.

4. [The collection device of claim 1 further including] *A mortar and debris collection device for use in a cavity wall construction having an inner wall and an outer wall with channels formed therein through which channels water can drain from a channel opening communicating with a cavity defined between the walls, comprising:*

*a water-permeable body positioned in alignment with at least some of said channels openings, said body having circuitous non-linear pathways therethrough which interrupt the downward movement of free-falling material and extending from an upper surface upon which water and debris can fall, and yielding a porosity for said body sufficient to permit water to pass therethrough, but mortar and other debris is substantial prevented from passing therethrough, at least a portion of said body having a thickness dimension substantially the same as the cavity between said inner and outer wall, and* a wick for wicking water attached to said body, said wick being adapted to fill a channel.

5. The collection device of claim 1 wherein said body is adapted to be emplaced within the cavity resting on a wall base at the bottom of the cavity, with the body covering at least one respective channel opening and blocking the channel opening from mortar and debris.

6. The collection device of claim 2 wherein said body has a horizontal thickness defined perpendicular to said long axis, and has a non-planar contour along said thickness on said upper surface.

7. The collection device of claim 1 wherein the body portion having a thickness dimension substantially the same as the space between said inner and outer walls is located at the lower end of said body.

8. The collection device of claim 1 wherein said body has substantially the same thickness dimension throughout its length and height.

9. The collection device of claim 1 wherein said body is positioned in alignment with at least some of said channel openings by being positioned directly outwardly of said openings.

10. A mortar and debris collection device for use in a cavity wall construction having an inner wall and an outer wall with channels formed therein through which channels water can drain from a channel opening communicating with a cavity defined between the walls, comprising:

a water-permeable body having circuitous non-linear pathways therethrough extending from an upper surface upon which water and debris can fall, and yielding a porosity for said body sufficient to permit water to pass therethrough, but mortar and other debris is substantially prevented from passing therethrough, said body being formed of a water-resistant fibrous mass and emplaceable within the cavity without any fixation device required*, said body having first and second horizontal surface portions exposed from above and located on at least two elevations*.

11. [The collection device of claim 10] *A mortar and debris collection device for use in a cavity wall construction having an inner wall and an outer wall with channels formed therein through which channels water can drain from a channel opening communicating with a cavity defined between the walls, comprising:*

*a water-permeable body having circuitous non-linear pathways therethrough extending from an upper surface upon which water and debris can fall, and yielding a porosity for said body sufficient to permit water to pass therethrough, but mortar and other debris is substantially prevented from passing therethrough, said body being formed of a water-resistant fibrous mass and emplaceable within the cavity without and fixation device required,* wherein said body is elongated along a long axis and further includes at least one reinforcing rod affixed to said body extending generally parallel to said long axis.

12. A mortar and debris collection device for use in a cavity wall construction having an inner wall and an outer wall with weep holes formed therein through which weep holes water can drain from a weep hole opening communicating with a cavity defined between the walls, comprising:

a water-permeable porous body of non-water absorbent randomly oriented fibrous material positioned in alignment with at least some of said weep hole openings, said body having a porosity sufficient to permit water to pass therethrough but mortar and debris is substantially prevented from passing therethrough, said body having an upper surface including upwardly extending protrusions yielding peaks and valleys adapted to break up accumulations of mortar and debris falling thereon, at least a portion of said body having a thickness dimension substantially the same as the cavity between said inner and outer walls.

13. A mortar and debris collection device for use in a cavity wall construction having an inner wall and an outer wall with weep holes formed through a wall through which weep holes water can drain from a weep hole opening communicating with a cavity defined between the inner and outer walls, comprising:

a body of randomly oriented non-water absorbent fibrous material formed into a water-permeable porous mass, said body being positioned in alignment with at least some of weep hole openings and having a porosity sufficient to permit water to pass therethrough but substantially insufficient to permit mortar and debris to pass therethrough, said body having a height and width sized to cover at least one of the weep hole openings and emplaceable within the cavity without any fixation device required, at least a portion of said body having a thickness dimension substantially the same as the cavity between said inner and outer walls, *said body having a plurality of upwardly facing first surfaces formed thereon that are separated by first horizontal spaces, and a plurality of upwardly facing second surfaces formed thereon that are separated by second horizontal spaces, said second surfaces elevated from said first surfaces, at least some of said first surfaces being disposed in vertical alignment with some of said second horizontal spaces between said second surfaces, whereby mortar and other debris falling under the influence of gravity within said cavity contacts at least one of said first and second surfaces.*

14. The collection device of claim 13 wherein said body is emplaced within the cavity and rests on a wall base at the bottom of the cavity to cover at least one respective opening and block the opening from mortar and debris.

15. The collection device of claim 13 further including a wick for wicking water extending from said body at a body bottom, said wick adapted to fit within the weep hole.

16. A drainage system for use in a cavity wall construction having an inner wall and an outer wall with weep holes formed through one of the walls adjacent a wall base at the bottom of the walls through which weep holes water can drain from a weep hole opening communicating with a cavity defined between the walls, comprising:

a plurality of horizontally elongated drainage blocks, each of said blocks being made of porous material formed with circuitous paths through said blocks through which water can pass but through which mortar and other debris cannot pass, each said block being sized to fit within the cavity with a lateral face of said block being positioned in alignment with and covering at least one respective opening and blocking the opening from mortar and other debris with said block resting on the wall base, each of said blocks having an upper surface upon which mortar and other debris can collect, at least a portion of said body having a thickness dimension substantially the same as the cavity between said inner and outer walls, *said upper surface having first and second horizontal surface portions exposed from above and located on at least two elevations.*

17. [The drainage system of claim 16 wherein said drainage blocks have an] *A drainage system for use in a cavity wall construction having an inner wall and an outer wall with weep holes formed through one of the walls adjacent a wall base at the bottom of the walls through which weep holes water can drain from a weep hole opening communication with a cavity defined between the walls, comprising:*

*a plurality of horizontally elongated drainage blocks, each of said blocks being made of porous material formed with circuitous paths through said blocks through which water can pass but through which mortar and other debris cannot pass, each said block being sized to fit within the cavity with a lateral face of said block being positioned in alignment with and covering at least one respective opening and blocking the opening from mortar and other debris with said block resting on the wall base, each of said blocks having an upper surface upon which mortar and other debris can collect, at least a portion of said body having a thickness dimension substantially the same as the cavity between said inner and outer walls, said* upper surface including upwardly extending protrusions formed thereon creating a non-planar surface contour of peaks and valleys.

18. A drainage system for use in a cavity wall construction having an inner wall and an outer wall with weep holes formed therein adjacent a wall base at the bottom of the walls through which weep holes water can drain from a weep hole opening communicating with a cavity defined between the walls, comprising:

a plurality of horizontally elongated debris blocking bodies, each of said bodies being made of non-water absorbent material formed into a permeable mass having a porosity sufficient to permit water to pass therethrough but insufficient to permit debris which is greater than about 1/16 inch to pass therethrough, each of said blocks having an upper surface upon which mortar and debris can collect, said bodies being emplaced within the cavity and at least some of said bodies resting on the wall base in alignment with and covering at least one respective opening and blocking the opening from debris, at least a portion of said body having a thickness dimension substantially the same as the cavity between said inner and outer walls, *said upper surface having first and second horizontal surface portions exposed from above and located on at least two elevations.*

19. A drainage system for use in a cavity wall construction having an inner wall, an outer wall, a wall base between the walls at the bottom of the cavity wall construction, and ties extending between and joining the walls above the base, with at least one channel formed in a wall through which channel water can drain from a channel opening communicating with a cavity defined between the walls comprising:

a plurality of mortar and other debris blocking bodies, each of said bodies being horizontally elongated along a major length with a surface upon which mortar and debris can collect, made of non-water absorbent material formed into a water-permeable porous mass of randomly oriented passages which interrupt the downward movement of free-falling material, said porous mass having a porosity sufficient to permit water to pass therethrough but insufficient to permit mortar and debris to pass therethrough, said bodies being emplaced within the cavity on the wall base in alignment with and covering at least one respective opening and blocking the opening from such mortar and debris, at least a portion of said bodies having a thickness dimension substantially the same as the cavity between said inner and outer walls, *said surface having first and second horizontal surface portions exposed from above and located on at least two elevations.*

20. A debris collection device for use in a cavity wall construction having an inner wall and an outer wall with weep holes formed therein adjacent a cavity wall base through which weep holes water can drain from a weep hole opening communicating with a cavity defined between the walls, comprising:

a plurality of screens, each said screen having a porosity sufficient to permit water to pass therethrough but insufficient to permit mortar and other debris having a size greater than about 1/16 inch to pass therethrough, and means for organizing said screens in overlapping arrangement in a plurality of generally parallel planes with screens in one or more of said planes being spaced one from another, said screen so organized giving the debris collection device a thickness at least as great as the horizontal distance between the inner and outer walls at the cavity wall base and defining a volume for the debris collection device, said screens being overlapped such that a vertical line perpendicular to said planes through said volume must intersect at least one screen, whereby mortar and other debris falling under the influence of gravity within the cavity and into said volume must contact at least one such screen.

21. The collection device of claim 20 further including a wick for wicking water extending through the weep hole into the cavity.

22. A mortar collecting device for use in a cavity wall construction having an inner wall and an outer wall with channels formed therein through which channels water can drain from a channel opening communicating with a cavity defined between the walls, comprising:

a supporting member having a lateral face, said supporting member having a vertical height and longitudinal length adapted to yield an area greater than that of at least one such channel opening, a plurality of projections extending from said lateral face, said projections being provided in staggered arrangement such that a vertical line extending parallel to said lateral face will contact at least one such projection, thereby forming a circuitous path for debris passing along said lateral face, whereby said collecting device when emplaced within the cavity with said projections overlying at least one such channel opening serves to prevent debris from plugging the channel opening.

23. The collecting device of claim 22 wherein said support member is a backing board having a planar lateral face, and said projections are adapted to extend across the cavity and contact one wall with said backing board abutting the other wall.

24. The collecting device of claim 20 wherein said projections are flexible.

25. The collecting device of claim 20 wherein said projections are resilient.

26. A mortar collecting device for use in a cavity wall construction having an inner wall and an outer wall with channels formed therein through which channels water can drain from a channel opening communicating with a cavity defined between the walls, comprising:

a supporting member having two lateral side faces, said supporting member having a vertical height and longitudinal length adapted to yield an area greater than that of at least one such channel opening, a plurality of projections extending outwardly from each said side lateral face, said projections being provided in staggered arrangement such that a vertical line extending parallel to each said side lateral face will contact at least one such projection, thereby forming a circuitous path for debris passing along each said side lateral face, whereby said collecting device when emplaced within the cavity with said projections overlying at least one such channel opening serves to prevent debris from plugging the channel opening.

27. The collection device of claim 26 wherein said body is elongated with a horizontal long axis, and further includes reinforcing means affixed to said body and extending parallel to said long axis for adding rigidity against bending along said long axis.

28. A mortar collecting device for use in a cavity wall construction having an inner wall and an outer wall with channels formed therein through which channels water can drain from a channel opening communicating with a cavity defined between the walls, comprising:

a pair of opposed supporting members each having a lateral face, each said supporting member having a vertical height and longitudinal length adapted to yield an area greater than that of at least one such channel opening, a plurality of projections extending between said lateral faces, said projections being provided in staggered arrangement such that a vertical line extending parallel to each said side lateral face will contact at least one such projection, thereby forming a circuitous path for debris passing between said opposed supporting members along a lateral face, whereby said collecting device when emplaced within the cavity overlying at least one such channel opening serves to prevent debris from plugging the channel opening.

29. A mortar collecting device for use in a cavity wall construction having an inner wall and an outer wall with weep holes formed therein adjacent a cavity bottom through which weep holes water can drain from a weep hole opening communicating with a cavity defined between the walls, comprising:

a water permeable body positioned in alignment with at least some of said weep hole openings, said body having non-linear water pathways formed therein which interrupt the downward movement of free-falling material and yielding a porosity sufficient to permit water to pass therethrough, said body having a horizontal axis relative to the cavity bottom, said body further including a layer of material extending along said horizontal axis which material passes water therethrough, at least a portion of said body having a thickness dimension substantially the same as the cavity between said inner and outer walls, *said body having a plurality of upwardly facing first surfaces formed thereon that are separated by first horizontal spaces, and a plurality of upwardly facing second surfaces formed thereon that are separated by second horizontal spaces, said second surfaces elevated from said first surfaces, at least some of said first surfaces being disposed in vertical alignment with some of said second horizontal spaces between said second surfaces, whereby mortar and other debris falling under the influence of gravity within said cavity contacts at least one of said first and second surfaces.*

30. [The collecting device of claim 29] *A mortar collecting device for use in a cavity wall construction having an inner wall and an outer wall with weep holes formed therein adjacent a cavity bottom through which weep holes water can drain from a weep hole opening communicating with a cavity defined between the walls, comprising:*

*a water permeable body positioned in alignment with at least some of said weep hole openings, said body having non-linear water pathways formed therein which interrupt the downward movement of free falling material and yielding a porosity sufficient to permit water to pass therethrough, said body having a horizontal axis relative to the cavity bottom, said body further including a layer of material extending along said horizontal axis which material passes water therethrough, at least a portion of said body having a thickness dimension substantially the same as the cavity between said inner and outer walls,* wherein said body has an upper surface including upwardly extending protrusions to prevent ponding of material falling on said upper surface.

31. The collecting device of claim 30 wherein said body is comprised of randomly oriented nonabsorbent fibrous material formed into a water permeable porous mass, said body having a porosity sufficient to permit water to pass therethrough but insufficient to permit mortar and other debris having a size greater than about 1/16 inch to pass therethrough, said body having a height and width sized to cover at least one of the weep hole openings.

32. A mortar and debris collection device for use in a cavity wall construction having an inner wall and an outer wall with channels formed therein through which channels water can drain from a channel opening communicating with a cavity defined between the walls, comprising:

a water-permeable body having circuitous non-linear pathways therethrough extending from an upper surface upon which water and debris can fall, and yielding a porosity for said body sufficient to permit water to pass therethrough, but mortar and other debris is substantially prevented from passing therethrough, said body being elongated along a long axis and having an upper surface with a non-planar contour along said long axis, and flashing affixed to said body along a body bottom which is opposite to said upper surface and generally parallel to said long axis.

33. A mortar and debris collection device for use in a cavity wall construction having an inner wall and an outer wall with channels formed therein through which channels water can drain from a channel opening communicating with a cavity defined between the walls, comprising:

a water-permeable body having circuitous non-linear pathways therethrough extending from an upper surface upon which water and debris can fall, and yielding a porosity for said body sufficient to permit water to pas therethrough, but mortar and other debris is substantially prevented from passing therethrough, said body being elongated along a long axis and having a horizontal thickness defined perpendicular to said long axis, said body also having an upper surface with a non-planar contour of stepped configuration along said upper surface.

34. A mortar and debris collection device for use in a cavity wall construction having an inner wall and an outer wall with weep holes formed therein through which weep holes water can drain from a weep hole opening communicating with a cavity defined between the walls, comprising:

a water-permeable porous body of non-water absorbent randomly oriented fibrous material having a porosity sufficient to permit water to pass therethrough, said body having an upper surface including upwardly extending protrusions which define overhangs along said upper surface to provide gaps in material collected on said upper surface.

35. A mortar and debris collection device for use in a cavity wall construction having an inner wall and an outer wall with weep holes formed through a wall through which weep holes water can drain from a weep hole opening communicating along with a cavity defined between the inner and outer walls, comprising:

a body of randomly oriented non-water absorbent fibrous material formed into a water-permeable porous mass, said body having a porosity sufficient to permit water to pass therethrough but substantially insufficient to permit mortar and debris to pass therethrough, said body having a height, and width sized to cover at least one of the weep hole openings, a wick for wicking water extending from said body at a body bottom, said wick adapted to fit within the weep hole, and flashing attached to said body bottom.

36. A drainage system for use in a cavity wall construction having an inner wall, an outer wall, a wall base between the walls at the bottom of the cavity wall construction, and ties extending between and joining the walls above the base, with at least one channel formed in a wall through which channel water can drain from a channel opening communicating with a cavity defined between the walls comprising:

a plurality of mortar and other debris blocking bodies, each of said bodies being made of non-water absorbent material formed into a water-permeable porous mass of randomly oriented passages, said porous mass having porosity sufficient to permit water to pass therethrough but insufficient to permit mortar and debris to pass therethrough, said bodies being emplaced within the cavity on the wall base covering at least one respectively opening and blocking the opening from such mortar and debris, said bodies having a thickness at least as great as the distance between the inner and outer walls at the wall base, with each said bodies freely resting on one or more of the wall base and ties.

37. A drainage system for use in a cavity wall construction having an inner wall, an outer wall, a wall base between the walls at the bottom of the cavity wall construction, and ties extending between and joining the walls above the base, with at least one channel formed in a wall through which channel water can drain from a channel opening communicating with a cavity defined between the walls comprising:

a plurality of mortar and other debris blocking bodies, each of said bodies being made of non-water absorbent material formed into a water-permeable porous mass of randomly oriented passages, said porous mass having a porosity sufficient to permit water to pass therethrough but insufficient to permit mortar and debris to pass therethrough, said bodies being emplaced within the cavity on the wall base covering at least one respective opening and blocking the opening from such mortar and debris, at least some of said bodies being elongated along a major length and include a reinforcing rod extending along said major length to provide further rigidity to said body, as for supporting said body between ties in the cavity.

*38. The collection device of claim 1 wherein said upwardly facing first and second surfaces are oriented in vertically and horizontally spaced apart rows.*

*39. The collection device of claim 1 wherein said body includes first and second screen portions, and wherein said first surfaces are formed on said first screen portions, said first surfaces disposed generally along a first substantially horizontal plane; and*

*said second surfaces are formed on said second screen portions, said second screen portions having a bottom surface facing downwardly and disposed generally along a second substantially horizontal plane, said first and second substantially horizontal planes being separated by a vertical space.*

*40. The collection device of claim 39 wherein said first and second screen portions have a horizontal thickness dimension substantially the same as the cavity between said inner and outer walls.*

*41. The collection device of claim 39 wherein said first and second surfaces are substantially horizontally oriented.*

*42. The collection device of claim 39 wherein said first screen portions are arranged spaced apart along the horizontal direction, and said second screen portions are arranged spaced apart along the horizontal direction, said first screen portions are each arranged to have at least a portion of a respective first surface located along the horizontal direction between two adjacent ones of said second screen portions.*

*43. The collection device of claim 42 further comprising a plurality of third screen portions spaced apart along the horizontal direction and located at a lower elevation than said first screen portions, said third screen portions include a third upwardly facing surface, said third screen portions are arranged to have at least a portion of a respective third surface located along the horizontal direction between two adjacent ones of said first screen portions.*

*44. The collection device of claim 43 wherein said first screen portions include a bottom surface arranged generally along a third horizontal plane, and said third upwardly facing surfaces of said third screen portions are arranged generally along a fourth horizontal plane, said third horizontal plane and said fourth horizontal plane being separated by a further vertical space.*

*45. The collection device of claim 44 wherein said first, second and third screen portions are formed by random-fiber, fibrous material.*

*46. The collection device of claim 1 wherein said body includes first and second screen portions, and wherein said first surfaces are formed on said first screen portions, said first surfaces disposed generally along a first substantially horizontal plane; and*

*said second surfaces are formed on said second screen portions, said second screen portions having a bottom surface facing downwardly and disposed generally along a second substantially horizontal plane, said first and second substantially horizontal planes being separated by a vertical space;*

*wherein said first and second screen portions have a horizontal thickness dimension substantially the same as the cavity between said inner and outer walls;*

*wherein said first and second surfaces are substantially horizontally oriented;*

*wherein said first screen portions are arranged spaced apart along the horizontal direction, and said second screen portions are arranged spaced apart along the horizontal direction, said first screen portions are each arranged to have at least a portion of a respective first surface located along the horizontal direction between two adjacent ones of said second screen portions;*

*and comprising a plurality of third screen portions spaced apart along the horizontal direction and located at a lower elevation than said first screen portions, said third screen portions include a third upwardly facing surface, said third screen portions are arranged to have at least a portion of a respective third surface located along the horizontal direction between two adjacent ones of said first screen portions;*

*wherein said first screen portions include a bottom surface arranged generally along a third horizontal plane, an said third upwardly facing surfaces of said third screen portions are arranged generally along a fourth horizontal plane, said third horizontal plane and said fourth horizontal plane being separated by a further vertical space; and*

*wherein said first, second and third screen portions are formed by random-fiber, fibrous material.*

*47. The collection device of claim 1 wherein said body includes first and second screen portions, and wherein said first surfaces are formed on said first screen portions, said first surfaces disposed generally along a first substantially horizontal plane; and*

*said second surfaces are formed on said second screen portions, said second screen portions having a bottom surface facing downwardly and disposed generally along a second substantially horizontal plane, said first and second substantially horizontal planes being separated by a vertical space; and*

*said first and second screen portions are formed by random-fiber, fibrous material.*

*48. The collection device of claim 1 wherein said body includes a plurality of third upwardly facing surfaces, said third upwardly facing surfaces located on an elevation below said first and second upwardly facing surfaces.*

*49. The collection device of claim 1 wherein said body includes first and second screen portions, and wherein said first surfaces are formed on said first screen portions; and*

*said second surfaces are formed on said second screen portions,*

*wherein said first screen portions are arranged spaced apart along the horizontal direction, and said second screen portions are arranged spaced apart along the horizontal direction, said first screen portions are each arranged to have at least a portion of a respective first surface located along the horizontal direction between two adjacent ones of said second screen portions;*

*and a plurality of third screen portions spaced apart along the horizontal direction and located at a lower elevation than said first screen portions, said third screen portions include a third upwardly facing surface, said third screen portions are arranged to have at least a portion of a respective third surface located along the horizontal direction between two adjacent ones of said first screen portions.*

*50. A mortar and debris collection device for use in a cavity wall construction having an inner wall and an outer wall with channels formed therein through which channels water can drain from a channel opening communicating with a cavity defined between the walls, comprising:*

*a water-permeable body positioned in alignment with at least some of said channels openings, said body having circuitous non-linear pathways therethrough which interrupt the downward movement of free-falling material and extending from an upper surface upon which water and debris can fall, and yielding a porosity for said body sufficient to permit water to pass therethrough, but mortar and other debris is substantially prevented from passing therethrough, at least a portion of said body having a thickness dimension substantially the same as the cavity between said inner and outer walls, said body having a plurality of upwardly facing surfaces formed thereon that are separated by horizontal spaces, whereby mortar and other debris falling under the influence of gravity within said cavity can contact one of said upwardly facing surfaces or fall through one of said horizontal spaces.*

* * * * *

UNITED STATES PATENT AND TRADEMARK OFFICE

CERTIFICATE OF CORRECTION

PATENT NO. : Re 36,676
DATED : May 2, 2000
INVENTOR(S) : Tom Sourlis

It is certified that error appears in the above-identified patent and that said Letters Patent is hereby corrected as shown below:

Title page of the patent should indicate under "References Cited" the following:

Rand et al., "Work in Progress; Crossover Technology in Brick Construction," A.I.A. Institute Scholars Program, December 20, 1989.

Signed and Sealed this

Twenty-first Day of August, 2001

*Attest:*

Nicholas P. Godici

*Attesting Officer*

NICHOLAS P. GODICI
*Acting Director of the United States Patent and Trademark Office*